(12) United States Patent
Krabbenborg

(10) Patent No.: US 8,674,027 B2
(45) Date of Patent: Mar. 18, 2014

(54) POWDERED THERMOPLASTIC POLYOLEFIN ELASTOMER COMPOSITION FOR SLUSH MOLDING PROCESSES

(75) Inventor: Franciscus J. T. Krabbenborg, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/394,820

(22) PCT Filed: Sep. 10, 2010

(86) PCT No.: PCT/US2010/048329
§ 371 (c)(1),
(2), (4) Date: Mar. 8, 2012

(87) PCT Pub. No.: WO2011/034776
PCT Pub. Date: Mar. 24, 2011

(65) Prior Publication Data
US 2012/0172534 A1 Jul. 5, 2012

Related U.S. Application Data

(60) Provisional application No. 61/243,608, filed on Sep. 18, 2009, provisional application No. 61/330,525, filed on May 3, 2010.

(51) Int. Cl.
*C08L 23/00* (2006.01)
*B28B 1/14* (2006.01)
*C08F 10/14* (2006.01)

(52) U.S. Cl.
USPC .................. 525/240; 264/299; 526/348.2

(58) Field of Classification Search
USPC .................. 525/240; 264/299; 526/348.2
See application file for complete search history.

(56) References Cited

U.S. PATENT DOCUMENTS

| | | | |
|---|---|---|---|
| 3,424,703 A | 1/1969 | Jones et al. | |
| 3,645,992 A | 2/1972 | Elston | |
| 4,650,126 A | 3/1987 | Feder et al. | |
| 4,701,432 A | 10/1987 | Welborn, Jr. | |
| 4,798,081 A | 1/1989 | Hazlitt et al. | |
| 4,935,397 A | 6/1990 | Chang | |
| 4,937,299 A | 6/1990 | Ewen et al. | |
| 4,937,301 A | 6/1990 | Chang | |
| 5,055,438 A | 10/1991 | Canich | |
| 5,091,461 A | 2/1992 | Skochdopole | |
| 5,272,236 A | 12/1993 | Lai et al. | |
| 5,278,272 A | 1/1994 | Lai et al. | |
| 6,803,417 B2 | 10/2004 | Cree et al. | |
| 7,037,979 B2 | 5/2006 | Kakarala et al. | |
| 7,355,089 B2 | 4/2008 | Chang et al. | |
| 2002/0151649 A1 * | 10/2002 | Enami et al. | 525/88 |
| 2004/0147680 A1 | 7/2004 | Sugimoto | |
| 2006/0019930 A1 | 1/2006 | Pepys et al. | |
| 2006/0199930 A1 | 9/2006 | Li Pi Shan et al. | |

FOREIGN PATENT DOCUMENTS

| | | |
|---|---|---|
| EP | 0129368 | 12/1984 |
| EP | 0260999 | 3/1988 |
| EP | 0391413 | 10/1990 |
| EP | 0639613 | 2/1995 |
| WO | 9007526 | 7/1990 |
| WO | 2005090425 | 9/2005 |
| WO | 2005090426 | 9/2005 |
| WO | 2005090427 | 9/2005 |

OTHER PUBLICATIONS

U.S. Appl. No. 60/553,906, filed Mar. 17, 2004, Non-Provisional.
U.S. Appl. No. 60/662,937, filed Mar. 17, 2005, Non-Provisional.
U.S. Appl. No. 60/662,939, filed Mar. 17, 2005, Non-Provisional.
U.S. Appl. No. 60/662,938, filed Mar. 17, 2005, Non-Provisional.
PCT Application No. PCT/US2005/008916, filed Mar. 17, 2005.
PCT Application No. PCT/US2005/008915, filed Mar. 17, 2005.
PCT Application No. PCT/US2005/008917, filed Mar. 17, 2005.
B. Wunderlich, Macromolecular Physics, vol. 3, Crystal Melting, Academic Press, New Your, 1980, p. 48.
Wilde, L.; Ryle, T.R.; Knobeloch, D.C.; Peat, I.R.; Determination of Branching Distributions in Polyethylene and Ethylene Copolymers, J. Polym. Sci., 20, 441-455 (1982).
Williams and Ward, J. Polym. Sci., Polym. Let., 6, 621 (1968).
Randall, J.C.; JMS-Rev. Macromol. Chem. Phys., C29, 201-317 (1989).
Modern Plastics Encyclopedia/89, mid Oct. 1988 Issue, vol. 65, No. 11, pp. 86-92.

* cited by examiner

*Primary Examiner* — William Cheung

(57) ABSTRACT

The present invention relates to a thermoplastic polyolefin elastomer composition in powder form comprising (i) an olefin block copolymer or (ii) a substantially linear ethylene polymer and/or a linear ethylene polymer and propylene polymer blend. Said composition demonstrates good pulverizing and flow characteristics at ambient temperature. In another aspect, this invention relates to a process for preparing said thermoplastic polyolefin elastomer powder and applications for using said powder. In a further aspect, this invention relates to slush molding said thermoplastic polyolefin elastomer composition into skins, particularly skins for automotive interior applications such as instrument panels.

6 Claims, No Drawings

POWDERED THERMOPLASTIC POLYOLEFIN ELASTOMER COMPOSITION FOR SLUSH MOLDING PROCESSES

CROSS REFERENCE STATEMENT

This application is the U.S. National Stage of International (PCT) Patent Application No. PCT/US2010/048329, which claims the benefit of U.S. Provisional Application No. 61/243,608, filed Sep. 18, 2009, and U.S. Provisional Application No. 61/330,525, filed May 3, 2010, which are incorporated herein by reference.

FIELD OF THE INVENTION

The present invention relates to a thermoplastic polyolefin elastomer composition in powder form comprising an olefin block copolymer or a substantially linear ethylene polymer and/or a linear ethylene polymer and propylene polymer blend. Said composition demonstrates good pulverizing and flow characteristics at ambient temperature. In another aspect, this invention relates to a process for preparing said thermoplastic polyolefin elastomer powder and applications for using said powder. In a further aspect, this invention relates to slush molding said thermoplastic polyolefin elastomer composition into skins, particularly skins for automotive interior applications such as instrument panels.

BACKGROUND OF THE INVENTION

There are several methods to make skins for plastic articles, for example skins on an automotive interior article, such as an instrument panel. Positive thermoforming, negative thermoforming, sprayed polyurethane (PU), and shush molding are four major processes used to make skins for such interior articles. Slush molding and sprayed PU offer the most design freedom with some process advantages. The overall system cost for slush molding is much lower than sprayed PU.

In the slush molding technique, a free-flowing, powdered polymer is charged to an open top container or box, i.e., a slush box. A heated mold in the form of the article or object to be molded is clamped on top of the slush box, and the container rotated in a manner such that the free-flowing polymer powder contacts the hot mold where the powder melts and flows over the mold. The container is then returned to its original position, the mold removed from the container, and the article removed from the mold. This technique can realize complex shapes with sharp edges and excellent grain retention.

Introduction of passenger and door airbags has changed the requirement for automotive interior skins from predominately appearance only criteria to that of a safety composition. Until recently, polyvinyl chloride (PVC) resins were the material of choice for interior skins, and they are ideally suited for slush molding. However, PVC formulations suffer from migration and volatilization of the plasticizers over time, and this leads both to physical property changes in the PVC as it ages and to fogging of the car window glass. PVC also suffers from being heavier than alternative materials (an important consideration in the current design of automobiles with the emphasis on lighter materials to reduce the overall weight of the vehicle and thus increase its gas efficiency). Additionally, the hardness, storage modulus, and brittleness of PVC increases as the ambient temperature decreases, and thus at low temperatures, e.g., about −40° C., the instrument panel skin upon airbag deployment could splinter.

An alternative to PVC is thermoplastic polyurethanes (TPU) which can be engineered to have the necessary flow characteristics required for slush molding. TPU has good scratch and mar properties and better low temperature properties than PVC, but aromatic based TPU has poor ultraviolet (UV) light resistance. Aliphatic isocyanates can be used to prepare TPU having good UV light resistance but at a significant cost penalty.

Blends of polypropylene (PP) and a polyolefinic rubber, referred to as thermoplastic polyolefin (TPO), is yet another alternative. TPO posses better ductility than PVC. Moreover, it retains its ductility over time since it does not contain any low molecular weight plasticizers, as does PVC. TPO performs better in comparison to PVC in interior automotive applications. TPO is less expensive as compared to TPU.

A critical property for good slush molding moldability is powder flow for achieving good surface quality in terms of good grain appearance and good grain definition. However, conventional TPO require cryogenic (subzero) pulverization which may create hooks and tails which adversely impacts the powder flow of slush TPO and, hence, the quality of the part, see U.S. Pat. No. 7,037,979 and US Publication No. 2004/0147680, both of which are incorporated herein in their entirety. Additionally, cryogenic pulverization adds complexity and cost to manufacturing a powder TPO. Ambient temperature pulverizing has been disclosed with the addition of a grinding aid. For example, U.S. Pat. No. 4,650,126 discloses the addition of such grinding aids as silica, calcium carbonate, zinc oxide, magnesium oxide, clay, and the like. Another example of ambient grinding with a grinding aid is taught in U.S. Pat. No. 6,803,417 wherein an exotic silane-grafted multi-component TPO composition which requires curing has been disclosed, however at a significant cost penalty.

Thus, there is a need by the automobile manufacturers and others to develop a polymer composition for automotive interior applications, especially polymer powder for slush molding operations, which has good scratch and mar resistance, excellent low temperature properties, adequate hardness (e.g., Shore A hardness) while demonstrating good powder flow characteristics and the ability to be pulverized at ambient temperature.

SUMMARY OF THE INVENTION

The thermoplastic polyolefin composition of the present invention is such a composition. It is well suited for use in a slush molding process.

In one embodiment, the thermoplastic polyolefin composition of the present invention comprises one or more polymeric material with one or more soft segment and one or more hard segment, said composition in the form of a powder intended for production of skins, by slush molding wherein said composition has a Shore A hardness greater than 75, a Tg less than −45° C., and a distinct melting peak greater than 95° C. as determined by DSC.

In another embodiment, the thermoplastic polyolefin composition of the present invention comprises:
 (i) an olefin block copolymer, comprising one or more hard segment and one or more soft segment and characterized by one or more of the aspects described as follows:
  (i.a) has a weight average molecular weight/number average molecular weight ratio (Mw/Mn) from about 1.7 to about 3.5, at least one melting peak (Tm) in degrees Celsius, and a density (d) in grams/cubic centimeter (g/cc), wherein the numerical values of Tm and d correspond to the relationship:

$$T_m > -2002.9 + 4538.5(d) - 2422.2(d)^2$$

or $$T_m > -6553.3 + 13735(d) - 7051.7(d)^2;$$

or (i.b) has a Mw/Mn from about 1.7 to about 3.5, and is characterized by a heat of fusion (ΔH) J/g and a delta quantity, ΔT, in degrees Celsius defined as the temperature difference between the tallest differential scanning calorimetry (DSC) peak and the tallest crystallization analysis fractionation (CRYSTAF) peak, wherein the numerical values of ΔT and ΔH have the following relationships:

$$\Delta T > -0.1299(\Delta H) + 62.81$$

for ΔH greater than zero and up to 130 J/g, ΔT>48° C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (i.c) is characterized by an elastic recovery (Re) in percent at 300 percent strain and 1 cycle measured with a compression-molded film of the ethylene/alpha-olefin interpolymer, and has a density (d) in grams/cubic centimeter (g/cc), wherein the numerical values of Re and d satisfy the following relationship when ethylene/alpha-olefin interpolymer is substantially free of a cross-linked phase: Re>1481−1629(d); or (i.d) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; or (i.e) has a storage modulus at 25° C. (G'(25° C.)) and a storage modulus at 100° C. (G'(100° C.)) wherein the ratio of G'(25° C.) to G'(100° C.) is in the range of about 1:1 to about 9:1 or (i.f) has a molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (i.g) has an average block index greater than zero and up to about 1.0 and a molecular weight distribution, Mw/Mn, greater than about 1.3.

In another embodiment of the present invention, the thermoplastic polyolefin composition comprises a blend of (ii) a linear ethylene polymer, a substantially linear ethylene polymer, or mixtures thereof characterized as having (ii.a) a density of less than about 0.93 g/cm$^3$, (ii.a) a molecular weight distribution, $M_w/M_n$, of less than about 3.0, and (ii.a) a Composition Distribution Branch Index of greater than 30 percent;

and (iii) a propylene polymer having a crystallinity equal to or greater than 30 percent.

In a preferred embodiment, the thermoplastic polyolefin composition disclosed herein above is obtained by pulverizing said thermoplastic polyolefin composition at ambient temperature.

In yet another embodiment, the present invention is a process for the production of a skin using the thermoplastic polyolefin composition disclosed herein above comprising the steps of:

(a) forming said composition into a powder, preferably at ambient temperature, and (b) slush molding said powder into a skin.

In another embodiment, the present invention is an article covered with a slush molded skin comprising the thermoplastic polymer composition disclosed herein above.

In another embodiment, the present invention is a slush molded skin comprising the thermoplastic polymer composition disclosed herein above, preferably the skin is for an instrument panel, a console box, an arm rest, a head rest, a door trim, a rear panel, a pillar trim, a sunvisor, a trunk room trim, a trunk lid trim, an air bag cover, a seat buckle, a head liner, a gloves box, or a steering wheel cover.

DETAILED DESCRIPTION OF THE INVENTION

The thermoplastic polyolefin composition of the present invention comprises an elastomeric component, sometimes referred to as a soft segment, and a crystalline component, sometimes referred to as a hard segment. The thermoplastic polyolefin composition of the present invention may comprise two polymeric materials, for example, an elastomeric polymer (i.e., the soft segment) and a crystalline polymer (i.e., the hard segment). Preferably, the thermoplastic polyolefin of the present invention comprises a single polymeric material that comprises therein one or more soft segment and one or more hard segment.

Component (i) of the thermoplastic polyolefin composition of the present invention is an olefin block copolymer (OBC). The term "ethylene/alpha-olefin interpolymer" generally refers to polymers comprising ethylene and an alpha-olefin having 3 or more carbon atoms, such as propylene or other $C_4$ to $C_{20}$ alpha-olefins. Preferred alpha-olefins are propylene, 1-butene, 1-pentene, 1-hexene, 1-heptene, 1-decene, 1-dodecene, and most preferred is 1 octene. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an alpha-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer.

The term "multi-block copolymer" refers to a polymer comprising two or more chemically distinct regions or segments (also referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or $M_w/M_n$), block length distribution, and/or block number distribution due to the unique process making of the copolymers. More specifically, when produced in a continuous process, the polymers desirably possess PDI from about 1.7 to about 8, preferably from about 1.7 to about 3.5, more preferably from about 1.7 to about 2.5, and most preferably from about 1.8 to about 2.5 or from about 1.8 to about 2.1. When produced in a batch or semi-batch process, the polymers possess PDI from about 1.0 to about 2.9, preferably from about 1.3 to about 2.5, more preferably from about 1.4 to about 2.0, and most preferably from about 1.4 to about 1.8. It is noted that "block(s)" and "segment(s)" are used herein interchangeably.

The olefin block copolymers (i) of the present invention are an alpha-olefin interpolymer, specifically an alpha-olefin block copolymer comprising one or more hard segment and one or more soft segment and characterized by one or more of the aspects described as follows:

(i.a) has a weight average molecular weight/number average molecular weight ratio ($M_w/M_n$) from about 1.7 to about 3.5, at least one melting point ($T_m$) in degrees Celsius (° C.), and a density (d) in grams/cubic centimeter (g/cc), wherein the numerical values of Tm and d correspond to the relationship:

$$T_m > -2002.9 + 4538.5(d) - 2422.2(d)^2$$

or $$T_m > -6553.3 + 13735(d) - 7051.7(d)^2;$$

or (i.b) has a $M_w/M_n$ from about 1.7 to about 3.5, and is characterized by a heat of fusion ($\Delta H$) in Jules per gram (J/g) and a delta quantity, $\Delta T$, in degrees Celsius defined as the temperature difference between the tallest differential scanning calorimetry (DSC) peak and the tallest crystallization analysis fractionation (CRYSTAF) peak, wherein the numerical values of $\Delta T$ and $\Delta H$ have the following relationships:

$$\Delta T > -0.1299(\Delta H) + 62.81$$

for $\Delta H$ greater than zero and up to 130 J/g, $\Delta T > 48°$ C. for $\Delta H$ greater than 130 J/g,
wherein the CRYSTAF peak is determined using at least 5 percent of the cumulative polymer, and if less than 5 percent of the polymer has an identifiable CRYSTAF peak, then the CRYSTAF temperature is 30° C.; or (i.c) is characterized by an elastic recovery (Re) in percent at 300 percent strain and 1 cycle measured with a compression-molded film of the ethylene/alpha-olefin interpolymer, and has a density (d) in grams/cubic centimeter (g/cc), wherein the numerical values of Re and d satisfy the following relationship when ethylene/alpha-olefin interpolymer is substantially free of a cross-linked phase:

$$Re > 1481 - 1629(d);$$

or (i.d) has a molecular fraction which elutes between 40° C. and 130° C. when fractionated using TREF, characterized in that the fraction has a molar comonomer content greater than, or equal to, the quantity $(-0.2013)$ T+20.07, more preferably greater than or equal to the quantity $(-0.2013)$ T+21.07, where T is the numerical value of the peak elution temperature of the TREF fraction, measured in ° C.; or (i.e) has a storage modulus at 25° C. (G'(25° C.)) and a storage modulus at 100° C. (G'(100° C.)) wherein the ratio of G'(25° C.) to G'(100° C.) is in the range of about 1:1 to about 9:1 or (i.f) has a molecular fraction which elutes between 40° C. and 130° C. when fractionated using TREF, characterized in that the fraction has a block index of at least 0.5 and up to about 1 and a molecular weight distribution, $M_w/M_n$, greater than about 1.3; or (i.g) has an average block index greater than zero and up to about 1.0 and a molecular weight distribution, $M_w/M_n$, greater than about 1.3.

Processes for making the ethylene/alpha-olefin interpolymers have been disclosed in, for example, the following patent applications and publications: U.S. Provisional Application Nos. 60/553,906, filed Mar. 17, 2004; 60/662,937, filed Mar. 17, 2005; 60/662,939, filed Mar. 17, 2005; 60/5662938, filed Mar. 17, 2005; PCT Application Nos. PCT/US2005/008916, filed Mar. 17, 2005; PCT/US2005/008915, filed Mar. 17, 2005; PCT/US2005/008917, filed Mar. 17, 2005; WO 2005/090425, published Sep. 29, 2005; WO 2005/090426, published Sep. 29, 2005; and WO 2005/090427, published Sep. 29, 2005, all of which are incorporated by reference herein in their entirety. For example, one such method comprises contacting ethylene and optionally one or more addition polymerizable monomers other than ethylene under addition polymerization conditions with a catalyst composition comprising the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

The following test methods are used to characterize the olefin block copolymers of the present invention and are discussed in further detail in U.S. Pat. No. 7,355,089 and USP Publication No. 2006/0199930:

"Standard CRYSTAF method" or crystallization analysis fractionation is used to determine branching distributions. CRYSTAF is determined using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

"Flexural/Secant Modulus/Storage Modulus" samples are compression molded using ASTM D 1928. Flexural and 2 percent secant moduli are measured according to ASTM D-790. Storage modulus is measured according to ASTM D 5026-01 or equivalent technique.

"Melt Index" or $I_2$, is measured in accordance with ASTM D 1238, Condition 190° C./2.16 kg. Melt index, or $I_{10}$ is also measured in accordance with ASTM D 1238, Condition 190° C./10 kg. A useful value for comparison is the ratio $I_{10}/I_2$.

"DSC Standard Method" or Differential Scanning calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion (ΔH) and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

The observed heat of fusion ($\Delta H_{observed}$) for the second scan is recorded. The observed heat of fusion is related to the degree of crystallinity in weight percent based on the weight of the OBC sample by the following equation:

$$\text{Crystallinity } \% = \frac{\Delta H_{observed}}{\Delta H_{theoretical\ PE}} \times 100$$

where the heat of fusion for isotactic polypropylene ($\Delta H_{theoretical\ PE}$), as reported in B. Wunderlich, Macromolecular Physics, Volume 3, Crystal Melting, Academic Press, New York, 1980, is 292 J/g of polymer.

"GPC Method" is gel permeation chromatographic for molecular weight determinations. The system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene}=0.431(M_{polystyrene})$.

Polyethylene equivalent molecular weight calculations are performed using Viscotek TriSEC software Version 3.0.

"Density" measurement samples are prepared according to ASTM D 1928. Measurements are made within one hour of sample pressing using ASTM D792, Method B.

"ATREF" is analytical temperature rising elution fractionation analysis and is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

"$^{13}C$ NMR Analysis" samples are prepared by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}C$ resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS—Rev. Macromol. Chem. Phys., C29, 201-317 (1989), which is incorporated by reference herein in its entirety.

"Mechanical Properties—Tensile, Hysteresis, and Tear", stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

"Block Index" of the ethylene/α-olefin interpolymers is characterized by an average block index (ABI) which is greater than zero and up to about 1.0 and a molecular weight distribution, $M_w/M_n$, greater than about 1.3. The ABI is the weight average of the block index (BI) for each of the polymer fractions obtained in preparative TREF (fractionation of a polymer by Temperature Rising Elution Fractionation) from 20° C. and 110° C., with an increment of 5° C. (although other temperature increments, such as 1° C., 2° C., 10° C., also can be used):

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows.

$$2^{nd} \text{ moment weight average } BI = \sqrt{\frac{\Sigma(w_i(BI_i - ABI)^2)}{\frac{(N-1)\Sigma w_i}{N}}}$$

where N is defined as the number of fractions with $BI_i$ greater than zero. BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the ATREF (analytical TREF) elution temperature for the ith fraction (preferably expressed in Kelvin), $P_X$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the inventive copolymer. $T_{AB}$ can be calculated from the mole fraction of ethylene (measured by NMR) using the following equation:

$$Ln P_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. Random ethylene copolymers and/or preparative TREF fractions of random copolymers satisfy the following relationship:

$$Ln P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from $LnP_X = \alpha/T_{XO} + \beta$ from a measured $P_X$ mole fraction. Conversely, $P_{XO}$ is the ethylene mole fraction for a random copolymer of the same composition (i.e., the same comonomer type and content) and the same molecular weight and having an ATREF temperature of $T_X$, which can be calculated from $Ln P_{XO} = \alpha/T_X + \beta$ using a measured value of $T_X$. Once the block index (BI) for each preparative TREF fraction is obtained, the weight average block index, ABI, for the whole polymer can be calculated. Determination of Block Index is also described in US Patent Application Publication No. 2006-019930, which is herein incorporated by reference.

The olefin block copolymers of the present invention have a block index (weight averaged) greater than zero and up to about 1.0, preferably from 0.15 to 0.8, more preferably from 0.2 to 0.7, even more preferably from 0.4 to 0.6.

Component (ii) in the compositions of this invention comprises one or more substantially linear ethylene polymer or one or more linear ethylene polymer (S/LEP), or a mixture thereof. Both substantially linear ethylene polymers and linear ethylene polymers are known. Substantially linear ethylene polymers and their method of preparation are fully described in U.S. Pat. No. 5,272,236 and U.S. Pat. No. 5,278,272. Linear ethylene polymers and their method of preparation are fully disclosed in U.S. Pat. No. 3,645,992; U.S. Pat. No. 4,937,299; USP 4,701,432; U.S. Pat. No. 4,937,301; U.S. Pat. No. 4,935,397; U.S. Pat. No. 5,055,438; EP 129,368; EP 260,999; and WO 90/07526.

Suitable S/LEP comprises one or more $C_2$ to $C_{20}$ alpha-olefins in polymerized form, having a $T_g$ less than 25° C., preferably less than 0° C., most preferably less than −25° C. Examples of the types of polymers from which the present S/LEP are selected include copolymers of alpha-olefins, such as ethylene and propylene, ethylene and 1-butene, ethylene and 1-hexene or ethylene and 1-octene copolymers, and terpolymers of ethylene, propylene and a diene comonomer such as hexadiene norbornene.

As used here, "a linear ethylene polymer" means a homopolymer of ethylene or a copolymer of ethylene and one or more alpha-olefin comonomers having a linear backbone (i.e. no cross linking), no long-chain branching, a narrow molecular weight distribution and, for alpha-olefin copolymers, a narrow composition distribution. Further, as used here, "a substantially linear ethylene polymer" means a homopolymer of ethylene or a copolymer of ethylene and of one or more alpha-olefin comonomers having a linear backbone, a specific and limited amount of long-chain branching, a narrow molecular weight distribution and, for alpha-olefin copolymers, a narrow composition distribution.

Short-chain branches in a linear copolymer arise from the pendent alkyl group resulting upon polymerization of intentionally added $C_3$ to $C_{20}$ alpha-olefin comonomers. Narrow composition distribution is also sometimes referred to as homogeneous short-chain branching. Narrow composition distribution and homogeneous short-chain branching refer to the fact that the alpha-olefin comonomer is randomly distributed within a given copolymer of ethylene and an alpha-olefin comonomer and virtually all of the copolymer molecules have the same ethylene to comonomer ratio. The narrowness of the composition distribution is indicated by the value of the Composition Distribution Branch Index (CDBI) or sometimes referred to as Short Chain Branch Distribution Index. CDBI is defined as the weight percent of the polymer molecules having a comonomer content within 50 percent of the median molar comonomer content. The CDBI is readily calculated, for example, by employing temperature rising elution fractionation, as described in Wild, Journal of Polymer Science, Polymer Physics Edition, Volume 20, page 441 (1982), or U.S. Pat. No. 4,798,081. The CDBI for the substantially linear ethylene copolymers and the linear ethylene copolymers in the present invention is greater than about 30 percent, preferably greater than about 50 percent, and more preferably greater than about 90 percent.

Long-chain branches in substantially linear ethylene polymers are polymer branches other than short chain branches. Typically, long chain branches are formed by insitu generation of an oligomeric alpha-olefin via beta-hydride elimination in a growing polymer chain. The resulting species is a relatively high molecular weight vinyl terminated hydrocarbon which upon polymerization yields a large pendent alkyl group. Long-chain branching may be further defined as hydrocarbon branches to a polymer backbone having a chain length greater than n minus 2 ("n−2") carbons, where n is the number of carbons of the largest alpha-olefin comonomer intentionally added to the reactor. Preferred long-chain branches in homopolymers of ethylene or copolymers of ethylene and one or more $C_3$ to $C_{20}$ alpha-olefin comonomers have at least from 20 carbons up to more preferably the number of carbons in the polymer backbone from which the branch is pendant. Long-chain branching may be distinguished using $^{13}C$ nuclear magnetic resonance spectroscopy alone, or with gel permeation chromatography-laser light scattering (GPC-LALS) or a similar analytical technique. Substantially linear ethylene polymers contain at least 0.01 long-chain branches/1000 carbons and preferably 0.05 long-chain branches/1000 carbons. In general, substantially linear ethylene polymers contain less than or equal to 3 long-chain branches/1000 carbons and preferably less than or equal to 1 long-chain branch/1000 carbons.

Preferred substantially linear ethylene polymers are prepared by using metallocene based catalysts capable of readily polymerizing high molecular weight alpha-olefin copolymers under the process conditions. As used here, copolymer means a polymer of two or more intentionally added comonomers, for example, such as might be prepared by polymerizing ethylene with at least one other $C_3$ to $C_{20}$ comonomer. Preferred linear ethylene polymers may be prepared in a similar manner using, for instance, metallocene or vanadium based catalyst under conditions that do not permit polymerization of monomers other than those intentionally added to the reactor. Other basic characteristics of substantially linear ethylene polymers or linear ethylene polymers include a low residuals content (i.e. a low concentration therein of the catalyst used to prepare the polymer, unreacted comonomers and low molecular weight oligomers made during the course of the polymerization), and a controlled molecular architecture which provides good processability even though the molecular weight distribution is narrow relative to conventional olefin polymers.

While the substantially linear ethylene polymers or the linear ethylene polymers used in the practice of this invention include substantially linear ethylene homopolymers or linear ethylene homopolymers, preferably the substantially linear ethylene polymers or the linear ethylene polymers comprise between about 50 to about 95 weight percent ethylene and about 5 to about 50, and preferably about 10 to about 25 weight percent of at least one alpha-olefin comonomer. The comonomer content in the substantially linear ethylene polymers or the linear ethylene polymers is generally calculated based on the amount added to the reactor and as can be measured using infrared spectroscopy according to ASTM D-2238, Method B. Typically, the substantially linear ethylene polymers or the linear ethylene polymers are copolymers of ethylene and one or more $C_3$ to $C_{20}$ alpha-olefins, preferably copolymers of ethylene and one or more $C_3$ to $C_{10}$, alpha-olefin comonomers and more preferably copolymers of ethylene and one or more comonomers selected from the group consisting of propylene, 1-butene, 1-hexene, 4-methyl-1-pentane, and 1-octene. Most preferably the copolymers are ethylene and 1-octene copolymers.

The density of these substantially linear ethylene polymers or linear ethylene polymers is equal to or greater than 0.850 grams per cubic centimeter ($g/cm^3$) and preferably equal to or greater than 0.860 $g/cm^3$. Generally, the density of these substantially linear ethylene polymers or linear ethylene polymers is less than or equal to about 0.93 $g/cm^3$ and preferably less than or equal to about 0.900 $g/cm^3$. The melt flow ratio for substantially linear ethylene polymers, measured as $I_{10}/I_2$, is greater than or equal to about 5.63, is preferably from about 6.5 to about 15, and is more preferably from about 7 to about 10. $I_2$ is measured according to ASTM Designation D 1238 using conditions of 190° C. and 2.16 kilogram (kg) mass. $I_{10}$ is measured according to ASTM Designation D 1238 using conditions of 190° C. and 10.0 kg mass.

The $M_w/M_n$ for substantially linear ethylene polymers is the weight average molecular weight ($M_w$) divided by number average molecular weight ($M_n$). $M_w$ and $M_n$ are measured by gel permeation chromatography (GPC). For substantially linear ethylene polymers, the $I_{10}/I_2$ ratio indicates the degree of long-chain branching, i.e. the larger the $I_{10}/I_2$ ratio, the more long-chain branching exists in the polymer. In preferred substantially linear ethylene polymers $M_w/M_n$ is related to $I_{10}/I_2$ by the equation: $M_w/M_n \leq (I_{10}/I_2) - 4.63$. Generally, $M_w/M_n$ for substantially linear ethylene polymers is at least about 1.5 and preferably at least about 2.0 and is less than or equal to about 3.5, more preferably less than or equal to about 3.0. In a most preferred embodiment, substantially linear ethylene polymers are also characterized by a single DSC melting peak.

The preferred $I_2$ melt index for these substantially linear ethylene polymers or linear ethylene polymers is from about 0.01 g/10 min to about 100 g/10 min, and more preferably about 0.1 g/10 min to about 10 g/10 min.

The preferred $M_w$ for these substantially linear ethylene polymers or linear ethylene polymers is equal to or less than about 180,000, preferably equal to or less than about 160,000, more preferably equal to or less than about 140,000 and most preferably equal to or less than about 120,000. The preferred $M_w$ for these substantially linear ethylene polymers or linear ethylene polymers is equal to or greater than about 40,000, preferably equal to or greater than about 50,000, more preferably equal to or greater than about 60,000, even more preferably equal to or greater than about 70,000, and most preferably equal to or greater than about 80,000.

The substantially linear ethylene polymer and/or linear ethylene polymer is employed in the thermoplastic polyolefin composition of the present invention in amounts sufficient to provide the desired balance of processability, heat resistance, and toughness. In general, the substantially linear ethylene polymer and/or linear ethylene polymer is employed in amounts of at least about 70 parts by weight, preferably at least about 75 parts by weight, more preferably at least about 80 parts by weight based on the weight of the total composition. In general, the substantially linear ethylene polymer and/or linear ethylene polymer is used in amounts less than or equal to about 95 parts by weight, preferably less than or equal to about 90 parts by weight, more preferably less than or equal to about 85 parts by weight based on the weight of the total composition.

Component (iii) in the thermoplastic polyolefin composition of the present invention is one or more propylene polymer, preferably a propylene polymer with a degree of crystallinity equal to or greater than 30 percent. The propylene polymer suitable for use in this invention is well known in the literature and can be prepared by known techniques. In general, the propylene polymer is in the isotactic form, although other forms can also be used (e.g., syndiotactic or atactic). The propylene polymer used for the present invention is preferably a homopolymer of polypropylene or more preferably a copolymer, for example, a random or block copolymer, of propylene and an alpha-olefin, preferably a $C_2$ or $C_4$ to $C_{20}$ alpha-olefin. The alpha-olefin is present in the propylene copolymer of the present invention in an amount of not more than 20 percent by mole, preferably not more than 15 percent, even more preferably not more than 10 percent and most preferably not more than 5 percent by mole.

Examples of the $C_2$ and $C_4$ to $C_{20}$ alpha-olefins for constituting the propylene and alpha-olefin copolymer include ethylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene.

The propylene polymer of the present invention can be prepared by various processes, for example, in a single stage or multiple stages, by such polymerization method as slurry polymerization, gas phase polymerization, bulk polymerization, solution polymerization or a combination thereof using a metallocene catalyst or a so-called Ziegler-Natta catalyst, which usually is one comprising a solid transition metal component comprising titanium. Particularly a catalyst consisting of, as a transition metal/solid component, a solid composition of titanium trichloride which contains as essential components titanium, magnesium and a halogen; as an organometalic component an organoaluminum compound; and if desired an electron donor. Preferred electron donors are organic compounds containing a nitrogen atom, a phosphorous atom, a sulfur atom, a silicon atom or a boron atom, and preferred are silicon compounds, ester compounds or ether compounds containing these atoms.

Polypropylene is commonly made by catalytically reacting propylene in a polymerization reactor with appropriate molecular weight control agents. Nucleating agent is added after the reaction is completed in order to promote crystal formation. The polymerization catalyst should have high activity and be capable of generating highly tactic polymer. The reactor system must be capable of removing the heat of polymerization from the reaction mass, so the temperature and pressure of the reaction can be controlled appropriately.

A good discussion of various polypropylene polymers is contained in *Modern Plastics Encyclopedia/89*, mid October 1988 Issue, Volume 65, Number 11, pp. 86-92, the entire disclosure of which is incorporated herein by reference. The molecular weight of the propylene polymer for use in the present invention is conveniently indicated using melt flow rate (MFR) or MI, according to ASTM D 1238 at 230° C. and an applied load of 2.16 kg. MFR is inversely proportional to the molecular weight of the polymer. Thus, the higher the molecular weight, the lower the melt flow rate, although the relationship is not linear. The MFR for the propylene polymer useful herein is generally greater than about 0.1 g/10 min, preferably greater than about 0.5 g/10 min, more preferably greater than about 1 g/10 min, and even more preferably greater than about 10 g/10 min The MFR for the propylene polymer useful herein is generally less than about 200 g/10 min, preferably less than about 100 g/10 min, more preferably less than about 75 g/10 min, and more preferably less than about 50 g/10 min.

The degree of crystallinity for suitable propylene polymer for use in the present invention is equal to or greater than 30 weight percent, preferably equal to or greater than 50 weight percent, preferably equal to or greater than 60 weight percent, more preferably equal to or greater than 65 weight percent, and even more preferably equal to or greater than 70 weight percent based on the weight of the propylene polymer. The degree of crystallinity for the propylene polymer suitable for use in the present invention is less than or equal to 100 weight percent, preferably less than or equal to 90 weight percent, more preferably less than or equal to 80 weight percent, and most preferably less than or equal to about 75 weight percent based on the weight of the propylene polymer.

Unless otherwise noted, the degree of crystallinity for the propylene polymer of the present invention is determined by the following DSC method. A small sample (milligram size) of the propylene polymer is sealed into an aluminum DSC pan. The sample is placed into a DSC cell with a 25 centimeter per minute nitrogen purge and cooled to about −100° C. A standard thermal history is established for the sample by heating at 10° C. per minute to 225° C. The sample is then cooled to about −100° C. and reheated at 10° C. per minute to 225° C. The observed heat of fusion ($\Delta H_{observed}$) for the second scan is recorded. The observed heat of fusion is related to the degree of crystallinity in weight percent based on the weight of the polypropylene sample by the following equation:

$$\text{Crystallinity \%} = \frac{\Delta H_{observed}}{\Delta H_{isotactic\ PP}} \times 100$$

where the heat of fusion for isotactic polypropylene ($\Delta H_{isotactic\ PP}$), as reported in B. Wunderlich, Macromolecular Physics, Volume 3, Crystal Melting, Academic Press, New York, 1980, p 48, is 165 J/g of polymer.

In one embodiment of the present invention, the propylene polymer is not graft modified.

In another embodiment of the present invention, part, or all, of the propylene polymer of the present invention may be graft modified. A preferred graft modification of the polypropylene is achieved with any unsaturated organic compound containing, in addition to at least one ethylenic unsaturation (e.g., at least one double bond), at least one carbonyl group (—C═O) and that will graft to a polypropylene as described above. Representative of unsaturated organic compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, -methyl crotonic, and cinnamic acid and their anhydride, ester and salt derivatives, if any. Maleic anhydride is the preferred unsaturated organic compound containing at least one ethylenic unsaturation and at least one carbonyl group.

The unsaturated organic compound content of the grafted polypropylene is at least about 0.01 weight percent, preferably at least about 0.1 weight percent, more preferably at least about 0.5 weight percent, and most preferably at least about 1 weight percent based on the combined weight of the polypropylene and organic compound. The maximum amount of unsaturated organic compound content can vary to convenience, but typically it does not exceed about 10 weight percent, preferably it does not exceed about 5 weight percent, more preferably it does not exceed about 2 weight percent and most preferably it does not exceed about 1 weight percent based on the combined weight of the polypropylene and the organic compound.

The propylene polymer is employed in the thermoplastic polyolefin compositions of the present invention in amounts sufficient to provide the desired processability and good balance of stiffness and toughness. In general, the propylene polymer is employed in an amount of at least about 5 parts by weight, preferably at least about 10 parts by weight, more preferably at least about 15 parts by weight based on the weight of the total composition. In general, the propylene polymer is used in amounts less than or equal to about 30 parts by weight, preferably less than or equal to about 25 parts by weight, more preferably less than or equal to about 20 parts by weight based on the weight of the total composition.

The thermoplastic polyolefin composition of the present invention preferably has a density equal to or greater than 0.87, preferably equal to or greater than 0.875, more preferably equal to or greater than 0.88, more preferably equal to or greater than 0.885, more preferably equal to or greater than 0.89. The thermoplastic polyolefin composition of the present invention has a density equal to or less than 0.895 g/cc.

The thermoplastic polyolefin composition of the present invention preferably has a Shore A hardness equal to or greater than 75, preferably equal to or greater than 80, more preferably equal to or greater than 85, and more preferably equal to or greater than 90. The thermoplastic polyolefin composition of the present invention preferably has a Shore A hardness equal to or less than 95

The thermoplastic polyolefin composition of the present invention preferably has an $I_{10}/I_2$ equal to or less than 7, preferably equal to or less than 6.95, more preferably equal to or less than 6.9, more preferably equal to or less than 6.85, more preferably equal to or less than 6.8. The thermoplastic polyolefin composition of the present invention has an $M_w/M_n$ from equal to or greater than 1.3, preferably equal to or greater than 1.9, more preferably equal to or greater than 2, and even more preferably equal to or greater than 3.

The thermoplastic polyolefin composition of the present invention comprises a copolymer having a mol percent comonomer equal to or greater than 8, preferably equal to or greater than 9, more preferably equal to or greater than 9, and more preferably equal to or greater than 10. The thermoplastic polyolefin composition of the present invention comprises a copolymer having a mol percent equal to or less than 12.5, more preferably equal to or less than 12, more preferably equal to or less than 11.5, and most preferably equal to or less than 11.

The thermoplastic polyolefin composition of the present invention preferably has a soft segment content by weight percent equal to or less than 77.5, preferably equal to or less than 75, more preferably equal to or less than 72.5, more preferably equal to or less than 70, and more preferably equal to or less than 67.5. The thermoplastic polyolefin composition of the present invention preferably has a soft segment content by weight percent equal to or greater than 40, preferably equal to or greater than 50, more preferably equal to or greater than 60, and more preferably equal to or greater than 65.

The thermoplastic polyolefin composition of the present invention preferably has a hard segment content by weight percent equal to or less than 60, preferably equal to or less than 50, more preferably equal to or less than 40, and more preferably equal to or less than 35. The thermoplastic polyolefin composition of the present invention preferably has a hard segment content by weight percent equal to or greater than 22.5, preferably equal to or greater than 25, more preferably equal to or greater than 27.5, more preferably equal to or greater than 30, and more preferably equal to or greater than 32.5.

The thermoplastic polyolefin composition of the present invention preferably has a glass transition point ($T_g$) equal to or less than 0° C., preferably equal to or less than −25° C., more preferably equal to or less than −45° C., and more preferably equal to or less than −60° C. $T_g$ is the temperature or temperature range at which a polymeric material shows an abrupt change in its physical properties, including, for example, mechanical strength. $T_g$ can be determined by the DSC method described hereinabove.

The thermoplastic polyolefin composition of the present invention preferably has a melting peak ($T_m$) as determined by the hereindisclosed DSC method equal to or greater than 95° C., preferably equal to or greater than 100° C., more preferably equal to or greater than 105° C., more preferably equal to or greater than 110° C., more preferably equal to or greater than 115° C., and more preferably equal to or greater than 120° C.

The thermoplastic polyolefin composition of the present invention preferably has a heat of fusion as determined by the hereindisclosed DSC method equal to or greater than 40 J/g, preferably equal to or greater than 50 J/g, more preferably equal to or greater than 55 J/g, more preferably equal to or greater than 60 J/g, and more preferably equal to or greater than 70 J/g.

The thermoplastic polyolefin composition of the present invention preferably has a percent crystallinity as determined by the hereindisclosed DSC method equal to or greater than 19 percent, preferably equal to or greater than 20 percent, more preferably equal to or greater than 22 percent, more preferably equal to or greater than 25 percent, and more preferably equal to or greater than 30 percent.

The thermoplastic polyolefin composition of the present invention preferably has an $I_2$ melt index (190° C./2.16 kg) of equal to or less than 15 g/10 min, preferably equal to or less than 14 g/10 min, more preferably equal to or less than 12 g/10 min, and more preferably equal to or less than 10 g/10 min. The thermoplastic polyolefin composition of the present invention preferably has an $I_2$ melt index of equal to or greater than 0.01 g/10 min, preferably equal to or greater than 0.1 g/10 min, more preferably equal to or greater than 1 g/10 min, more preferably equal to or greater than 2.5 g/10 min, and more preferably equal to or greater than 5 g/10/min.

The thermoplastic polyolefin composition of the present invention preferably has an $I_{10}$ melt index (190° C./10 kg) of equal to or less than 100 g/10 min, preferably equal to or less than 90 g/10 min, more preferably equal to or less than 80 g/10 min, and more preferably equal to or less than 75 g/10 min. The thermoplastic polyolefin composition of the present invention preferably has an $I_{10}$ melt index of equal to or greater than 1 g/10 min, preferably equal to or greater than 5 g/10 min, more preferably equal to or greater than 10 g/10 min, more preferably equal to or greater than 15 g/10 min, and more preferably equal to or greater than 20 g/10/min.

Optionally, the thermoplastic polyolefin composition of the present invention may comprise a filler such as calcium carbonate, talc, clay, mica, wollastonite, hollow glass beads, titaninum oxide, silica, carbon black, glass fiber or potassium titanate. Preferred fillers are talc, wollastonite, clay, single layers of a cation exchanging layered silicate material or mixtures thereof. Talcs, wollastonites, and clays are generally known fillers for various polymeric resins. See for example U.S. Pat. Nos. 5,091,461 and 3,424,703; EP 639,613 A1; and EP 391,413, where these materials and their suitability as filler for polymeric resins are generally described.

Fillers may be employed to obtain optimized combinations of toughness and stiffness in the propylene polymer compositions according to the present invention. If present, the filler is employed in an amount of at least about 1 part by weight, preferably at least about 3 parts by weight, more preferably at least about 5 parts by weight, even more preferably at least about 10 parts by weight, and most preferably at least about 15 parts by weight based on the total weight of the composition. Usually it has been found sufficient to employ an amount of filler up to and including about 50 parts by weight, preferably up to and including about 40 parts by weight, more preferably up to and including about 30 parts by weight, more preferably up to and including about 25 parts by weight, more preferably up to and including about 20 parts by weight, and most preferably up to and including about 15 parts by weight based the total weight of the composition.

Optionally, the thermoplastic polyolefin composition of the present invention my further comprises an additional polymer which is a resin other than components (i), (ii), and (iii) above. Preferred additional polymers are polyethylene, preferably low density polyethylene (LDPE), linear low density polyethylene (LLDPE), and high density polyethylene (HDPE), polystyrene, polycyclohexylethane, polyesters, such as polyethylene terephthalate, ethylene/styrene interpolymers, syndiotactic PP, syndiotactic PS, ethylene/propylene copolymers (EP), ethylene/propylene/diene terpolymer (EPDM), and mixtures thereof. In one embodiment, the additional polymer is a crystalline polyolefin having a melting point greater than 100° C.

If present, the additional polymer is employed in amounts of equal to or greater than about 1 part by weight, preferably equal to or greater than about 3 parts by weight, more preferably equal to or greater than about 5 parts by weight, and most preferably equal to or greater than about 7 parts by weight based on the weight of the thermoplastic polyolefin composition. In general, the additional polymer is used in amounts less than or equal to about 40 parts by weight, preferably less than or equal to about 20 parts by weight, more preferably less than or equal to about 15 parts by weight, more preferably less than or equal to about 10 parts by weight, and most preferably less than or equal to about 8 parts by weight based on the weight of the thermoplastic polyolefin composition.

The claimed thermoplastic polyolefin compositions of the present invention may also optionally contain one or more additives that are commonly used in thermoplastic polyolefin compositions of this type. For example a slip agent, preferred slip agents are a saturated fatty acid amide or ethylenebis (amide), an unsaturated fatty acid amide or ethylenebis(amide) or combinations thereof. Other optional additives include, but are not limited to: ignition resistant additives, stabilizers, colorants, pigments, antioxidants, antistats, flow enhancers, mold releases, such as metal stearates (e.g., calcium stearate, magnesium stearate), nucleating agents, including clarifying agents, plasticizers such as paraffinic or hydrogenated mineral oils, etc. Preferred examples of additives are ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize polymer compositions against degradation caused by, but not limited to heat, light, and oxygen, or a mixture thereof may be used.

If used, such additives may be present in an amount from at least about 0.01 parts, preferably at least about 0.1 parts, more preferably at least about 1 parts, more preferably at least about 2 parts and most preferably at least about 5 parts by weight based on the total weight of the composition. Generally, the additive is present in an amount less than or equal to about 25 parts, preferably less than or equal to about 20 parts, more preferably less than or equal to about 15 parts, more preferably less than or equal to about 12 parts, and most preferably less than or equal to about 10 parts by weight based on the total weight of composition.

Preparation of the thermoplastic polyolefin compositions of this invention can be accomplished by any suitable mixing means known in the art, including being prepared in a reactor, powder-powder blending, or preferably dry blending the individual components, and subsequently melt mixing (e.g., using a Banbury mixer, an extruder, roll mill, etc.). The melt blended thermoplastic polyolefin may be converted directly to a powder or first comminuted to pellets then pulverized into a powder.

Typically, the solid thermoplastic composition of the present invention is available from bags, gaylords, bulk bins, rail cars, and/or silos in the form of pellets or sometimes powder. The thermoplastic polyolefin composition of the present invention is pulverized, ground, or milled for use in the slush molding process, preferably at ambient temperature. Grinding may occur under ambient atmosphere, e.g., air or under an inert atmosphere such as nitrogen. Further, grinding may occur under ambient pressure, under positive pressure, or under negative pressure. Pellets are transported, from for example their bulk storage, to a feed hopper and fed into the grinding equipment, often the feed is facilitated by a vibration feeder or the like. Any suitable pulverization equipment know in the art is applicable, for example using an attrition mill, a disk mill, a turbo mill, a pin mill, a vertical mill, a linlex mill, a hammer mill, a conical mill, a ball mill, a rod mill, a cutting mill such as a Wiley mill, a powder grinder, and the like. For a good descriptions of some of these mills see US Publication No. 2004/0147680. The ground particulate, or powder, is separated by size via a cyclone, screens, sifters, sieves, rotary gates, or combinations thereof. If necessary, material that is too coarse is recycled through the hopper, feeder, and grinding equipment. The powder is collected, for example in a finished product hopper, and used directly in the slush molding step or packaged into an appropriate container such as a bag or bulk bin.

The grinding of solid thermoplastic composition of the present invention occurs under exposure of mechanical forces which breakup the structure by overcoming of the interior bonding forces. After the grinding the state of the solid is changed and may be characterized by one or more of its particle size, its average particle size, its particle size distribution, and/or its particle shape. Thermoplastic compositions for use in the slush molding step of the present invention are preferably characterized by having a particle size of from about 150 microns to about 600 microns, preferably of from about 200 microns to about 425 microns. Preferably, 50 weight percent or more of the particles are within the particle size range of from about 200 microns to about 425 microns, more preferably 75 weight percent or more of the particles are within the particle size range of from about 200 microns to about 425 microns, and even more preferably 85 weight percent or more are within the particle size range of from 200 microns to about 425 microns. Alternatively, the ground particles have a weight average particle size between about 200 microns to about 425 microns, more preferably of from about 250 microns to about 350 microns, and even more preferably of from about 275 microns to about 325 microns.

The molding step of the method of the present invention is a slush molding process. Into the open top of a slush box is added the thermoplastic polyolefin composition of the present invention as a free flowing powder. A mold heated to a given temperature is fixed to the top of the slush box. The slush box is then rotated through 360° as many times as necessary to achieved the desired thickness of film on the heated mold, preferably rotated at least one time, more preferably 2 times, 3 times, 4 times, or more. The slush box may be rotated in a clockwise direction, a counter clockwise direction, or a combination thereof. The slush box may be rotated a final half turn (i.e. in the upside down position) and held for a desired length of time, for instance 5 seconds, 10, 15, 20, 25, 30 seconds or more then returned to the original position. The process provides a layer of partially or completely melted powder on the mold. Excess powder, if any, is removed, the mold may be further heated if necessary to complete melting, then the mold is cooled with suitable cooling means to form a film, and the film is stripped from mold.

The mold is preferably heated to a temperature of about 180° C. to 350° C., more preferably about 200° C. to 300° C., more preferably 240° C. to 280° C. The heating cycle (time that the mold is held at this elevated temperature to form homogeneous skin) is preferably about 2 to 6 minutes. Under these conditions, the powder of the composition of this invention melts, levels out, and forms a homogeneous skin. Following the heating cycle, the mold and homogeneous skin are cooled and the resulting film or sheet is removed from the mold.

The slush molding process of the present invention yields a resulting film or sheet that is useful as a free-standing material or as part of a laminated structure. The sheet may be embossed with a grain pattern. Such embossed sheet has excellent grain retention and thus has particular use in simulated leather applications and in instrument panel skins and door skins for automobiles. Automotive uses include skins for instrument panels and for other locations such as door panels and other simulated leather coverings. Thickness of the sheet can range from 0.1 mm to 2 mm.

In one embodiment, the present invention is an artificial leather comprising the composition of the present invention.

The molded articles according to the present invention are useful products in the following various fields: (i) in the automobile fields, for example, various automobile parts including interior cover materials of, for example, instrument panels, console boxes, arm rests, head rests, door trims, rear panels, pillar trims, sunvisors, trunk room trims, trunk lid trims, air bag covers, seat buckles, head liners, gloves boxes and steering wheel covers; interior molded articles of, for example, kicking plates and change lever boots; exterior parts of, for example, spoilers, side moles, number plate housings, mirror housings, air dam skirt and mud guards; and other molded articles of automobile parts; (ii) in the sport good fields, decorative parts of sport shoes, grips of rackets, sport tools and goods of various ball games, covering materials of saddles and handlebar grips of bicycles, motor-cycles, fishing lures, balls, and tricycles, etc.; (iii) in the housing and building fields, covering materials of furniture, desks, chairs, etc.; covering materials of gates, doors, fences, etc.; wall decorative materials; covering materials of curtain walls; indoor flooring materials of kitchens, wash rooms, toilets, etc; outdoor flooring materials such as verandas, terraces, balconies, carports, etc.; carpets such as front door or entrance mats, table cloths, coasters, ash tray doilies; (iv) in the industrial part field, grips and hoses for electric tools, etc., and the covering materials thereof; packing materials; and (v) in other fields, covering materials of bags, briefcases, cases, files, pocket books, albums, stationary, camera bodies, dolls and the other toys, hollow parts, a traffic cone, a tank bladder, a gasket, a boat bumper, a medical bulb, a mannequin, a lamp base, a boot, a mat, a foamed article, fabrics, a glove, a tape, a conveyor belt, outdoor furniture webbing, a tarpaulin, a tent, a window shade, wallpaper, a textile print for decorative or enhanced grip use, a coating for metal articles such as a tool handle, a wire basket, a bracket, and molded articles such as watch bands, outer frames of picture or photograph and their covering materials.

EXAMPLES

Example 1 (OBC-1) is an example of the present invention and Comparative Example A (OBC-2) is not an Example of the present invention:

"OBC-1" is an ethylene-octene block copolymer having an $I_2$ melt index (190° C./2.16 kg) of 5 g/10 min, an $I_{10}$ melt index (190° C./10 kg) of 35 g/10 min, a density of 0.887 g/cc, a percent hard segment of 33, a $T_g$ of −54° C., a melting peak of 120° C. as determined by DSC, a crystallinity of 25 percent, a heat of fusion of 73 J/g, and a Shore A hardness of 85; and "OBC-2" is an ethylene-octene block copolymer having an $I_2$ melt index (190° C./2.16 kg) of 15 g/10 min, $I_{10}$ a melt index (190° C./10 kg) of 105 g/10 min, a density of 0.877 g/cc, a $T_g$ of −54° C., a melting peak of 119° C., a crystallinity of 18 percent, a percent hard segment of 22, a heat of fusion of 54 J/g, and a Shore A hardness of 75.

Example 1 is ground at ambient temperature using a disk mill. Pellets are pneumatically transported to a feed hopper and into the disk mill via a vibration feeder, in which the feed rate is controlled by a temperature set point of the disk mill. After grinding, a fan blows the powder into a cyclone with a rotary valve which directs the powder to the top screen of a multi-screen sifter. Coarse and fine powder is separated and the coarse powder is recycled back to the feed hopper and the fine powder is collected and packaged into bags or bulk bins. Rates of about 100 kilogram per hour (kg/hr) are achieved. The fine powder has an weight average particle size of about 300 microns with about 85 weight percent of the fine powder having a particle size within the range of 200 microns to 450 microns.

Attempts to grind Comparative Example A at ambient temperature are unsuccessful. Attempted grinding results in particle agglomeration, sometimes referred to as meltdown resulting in blocking the mill.

After grinding, Example 1 is used in a slush molding process. The powder of Example 1 is put in a 30 cm×45 cm×30 cm powder box with a grain sheet mold which is heated to 265° C. The mold and the powder box are then turned over and held for about two minutes. The box is then turned upright and the mold is then withdrawn from the powder box and any residual powder adhering to the molded sheet and/or the mold is removed. The grain sheet is separated from the mold and measures about 2 mm. The composition and material property tests are summarized in Table 1, in Table 1:

"Melt Index" is determined according to ASTM D 1238 and unless otherwise indicated determined under the conditions for $I_2$ of 190° C./2.16 kg and reported as grams per 10 minutes (g/10 minutes) and for $I_{10}$ of 190° C./10 kg;

"Density" is determined according to ASTM 792 and is reported as grams per cubic centimeter (g/cc);

"$T_g$" is the glass transition temperature determined according to the DSC method described hereinabove; and "Melting Peak" is determined according to the DSC method described hereinabove;

"% Crystallinity" is determined according to the DSC method described hereinabove;

"Heat of Fusion" is determined according to the DSC method described hereinabove; and "Shore A Hardness" is determined according to ASTM D 2240;

"60° Gardner Gloss" is determined according to ASTM D523, values reported in percent; and "Tensile Rupture and Elongation" are determined according to ASTM D412.

TABLE 1

| PROPERTY | OBC-1 | OBC-2 |
|---|---|---|
| TPO Composition | | |
| Melt Index, g/min | | |
| $I_2$ @ 190° C./2.16 kg | 5 | 15 |
| $I_{10}$ @ 190° C./10 kg | 35 | 105 |
| Density, g/cc | 0.887 | 0.877 |
| Hard Segment, % | 33 | 22 |
| $T_g$, ° C. | −54 | −54 |
| Melting Peak, ° C. | 120 | 119 |
| % Crystallinity, % | 25 | 18 |

TABLE 1-continued

| PROPERTY | OBC-1 | OBC-2 |
|---|---|---|
| Heat of Fusion, J/g | 73 | 54 |
| Shore A Hardness | 85 | 75 |
| Particle Size, wt % | | |
| 200-425 microns | >85 | couldn't grind-melt down |
| Shush Molded Sheet | | |
| Gloss 60, as molded | 0.5 to 1 | |
| Tensile | | |
| Rupture, MPa | 10 | |
| Elongation, % | >500 | |

The invention claimed is:

1. A process to slush mold a thermoplastic polyolefin composition consisting essentially of:
   (i) an olefin block copolymer consisting of ethylene and propylene, 1-butene, 1-pentene, 1-hexene, 1-heptene, 1-octene, 1-decene, or 1-dodecene comprising one or more soft segment and one or more hard segment,
   (ii) optionally a linear ethylene polymer, a substantially linear ethylene polymer, or mixtures thereof consisting of ethylene and propylene, 1-butene, 1-hexene, or 1-octene, characterized as having
      (ii.a) a density of less than about 0.93 g/cm³,
      (ii.b) a molecular weight distribution, $M_w/M_n$, of less than about 3.0, and
      (ii.c) a Composition Distribution Branch Index of greater than 30 percent, and
   (iii) optionally a propylene polymer having a crystallinity equal to or greater than 30 percent,
wherein said composition has a Shore A hardness greater than 75, a Tg less than 45° C., and a distinct melting peak greater than 95° C. as determined by DSC,
comprising the steps of:
   (a) forming said composition into a powder, and
   (b) slush molding said powder into a skin.

2. The process of claim 1 wherein the olefin block copolymer, is characterized by one or more of the aspects described as follows:
   (i.a) has a weight average molecular weight/number average molecular weight ratio (Mw/Mn) from about 1.7 to about 3.5, at least one melting peak (Tm) in degrees Celsius, and a density (d) in grams/cubic centimeter (g/cc), wherein the numerical values of Tm and d correspond to the relationship:

$$T_m > -2002.9 + 4538.5(d) - 2422.2(d)^2$$

or $$T_m > -6553.3 + 13735(d) - 7051.7(d)^2;$$

or
   (i.b) has a Mw/Mn from about 1.7 to about 3.5, and is characterized by a heat of fusion (ΔH) J/g and a delta quantity, ΔT, in degrees Celsius defined as the temperature difference between the tallest differential scanning calorimetry (DSC) peak and the tallest crystallization analysis fractionation (CRYSTAF) peak, wherein the numerical values of ΔT and ΔH have the following relationships:

$$\Delta T > -0.1299(\Delta H) + 62.81$$

for ΔH greater than zero and up to 130 J/g, ΔT≥48° C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (i.c) is characterized by an elastic recovery (Re) in percent at 300 percent strain and 1 cycle measured with a compression-molded film of the ethylene/alpha-olefin interpolymer, and has a density (d) in grams/cubic centimeter (g/cc), wherein the numerical values of Re and d satisfy the following relationship when ethylene/alpha-olefin interpolymer is substantially free of a cross-linked phase: Re>1481−1629(d); or (i.d) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; or (i.e) has a storage modulus at 25° C. (G'(25° C.)) and a storage modulus at 100° C. (G'(100° C.)) wherein the ratio of G(25° C.) to G'(100° C.) is in the range of about 1:1 to about 9:1 or (i.f) has a molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (i.g) has an average block index greater than zero and up to about 1.0 and a molecular weight distribution, Mw/Mn, greater than about 1.3.

3. The process according to claim 1 wherein the thermoplastic polyolefin composition is pulverized, ground, or milled into a powder at ambient temperature.

4. The process of claim 1 wherein the slush molded skin is for an instrument panel, a console box, an arm rest, a head rest, a door trim, a rear panel, a pillar trim, a sunvisor, a trunk room trim, a trunk lid trim, an air bag cover, a seat buckle, a head liner, a gloves box, or a steering wheel cover.

5. The process of claim 1 wherein the slush molded skin is for a hollow part, a traffic cone, a tank bladder, a gasket, a boat bumper, a ball, a toy, a fish lure, a medical bulb, a mannequin, a lamp base, a boot, a mat, a foamed article, a fabric, a glove, a tape, a conveyor belt, outdoor furniture webbing, a tarpaulin, a tent, a window shade, wallpaper, a textile print, a metal article, a tool handle, a wire basket, or a bracket.

6. The process of claim 1 wherein the slush molded skin is an artificial leather.

* * * * *